United States Patent [19]

Murray

[11] 4,280,390
[45] Jul. 28, 1981

[54] SEALING ELEMENT

[75] Inventor: Myles N. Murray, Chagrin Falls, Ohio

[73] Assignee: Industrial Electronic Rubber Co., Twinsburg, Ohio

[21] Appl. No.: 36,022

[22] Filed: May 4, 1979

[51] Int. Cl.³ .................. F16B 43/00; F16B 39/24
[52] U.S. Cl. ...................... 411/542; 411/544
[58] Field of Search .......... 85/1 JP, 50 R; 151/38, 151/7; 277/180, 189, 166, 227

[56] References Cited

U.S. PATENT DOCUMENTS

| | | | |
|---|---|---|---|
| 2,983,534 | 5/1961 | Heller et al. | 85/1 JP X |
| 3,519,279 | 7/1970 | Wagner | 85/1 JP X |
| 3,606,357 | 9/1971 | Yonkers | 85/1 JP X |
| 3,661,046 | 5/1972 | Waud et al. | 85/1 JP X |
| 3,788,185 | 1/1974 | Gutshall | 85/1 JP |

*Primary Examiner*—Ramon S. Britts
*Attorney, Agent, or Firm*—Maky, Renner, Otto & Boisselle

[57] ABSTRACT

A sealing element is characterized by an upset metal disc having a central opening and reversely positioned annular grooves, and an annular sealing member in each groove. The sealing element as a sealing washer provides for effective sealing engagement with the head of a fastener and the surface of an article being fastened to seal the fastener opening in such article. The sealing element may also be employed as a valve seat and seal in a check valve assembly in which a biased poppet element is carried by the sealing element and is responsive to fluid pressure for controlled passage of fluid through the check valve assembly.

8 Claims, 5 Drawing Figures

SEALING ELEMENT

FIELD OF THE INVENTION

This invention relates generally to sealing elements, and more particularly to sealing washers for use with headed fasteners such as screws, bolts, nails or the like; and also to check valve assemblies and devices.

BACKGROUND OF THE INVENTION

In tanks, boats and the like, sealing washers are employed with headed fasteners such as screws, bolts, nails or the like to seal the fastener hole against leakage of fluid. One known sealing washer is an annular rubber washer which may be positioned in customary manner between the head of a fastener and the part being fastened. Upon tightening of the fastener, the opposed axial surfaces of the rubber washer will effect a seal between the underside of the fastener head and the surface of the part being fastened. Such rubber sealing washer is provided in a variety of forms such as an O-ring and the same may be employed effectively in many situations. However, one drawback of such rubber sealing washer is that under substantial tightening forces, the rubber washer tends to extrude radially between the fastener head and the fastened part which may lead to reduced effectiveness of the seal and/or may contribute to early failure of the rubber washer. Also, the rubber washer is not usually considered decorative in appearance and thus is undesirable for use in articles where the appearance thereof is important. For example, in the manufacture of boats, it is desirable to seal the fastener openings thereof while also providing a decorative accent to the boat.

Another known sealing washer is commonly referred to as a gasket seal and such gasket seal includes a disc-like flat metal body to which is molded on one side thereof an O-ring seal. Again, such as gasket seal has many desirable uses, but is subject to the same undersirable radial expansion of the O-ring seal when subjected to substantial tightening forces of the fastener as is the above noted rubber sealing washer. Moreover, such gasket seal depends at least partly upon metal-to-metal contact for effecting a seal between the fastener head and sealing washer. Also, such gasket seal is not known for its decorative appearance.

Other important considerations in the art of sealing washers, in addition to the ability to withstand substantial tightening forces and to be decorative in appearance, is that the sealing washers be inexpensive and easy to manufacture. It is also desirable that the sealing washers provide a stress relief capability, a fastener locking capability and a vibration damping capability.

While sealing washers are principally employed to seal fastener openings, check valves are employed in numerous arrangements essentially to permit and/or control passage of fluid through the check valve in one direction when the pressure differential across the valve exceeds a predetermined amount. Known check valves come in a variety of forms and constructions and may be used in many ways. It would be advantageous, however, to provide yet another check valve which is inexpensive and easy to manufacture, which can withstand substantial pressures and flows, and which may be readily inserted into existing fitting openings in parts for use in controlling flow through such fitting.

SUMMARY OF THE INVENTION

The sealing element of this invention may be employed as a sealing washer for use with a headed fastener such as a screw, bolt, nail or the like to seal the fastener hole in a fastened part against leakage of fluid. The sealing washer is decorative in appearance and can withstand substantial tightening forces without degradation of the seal effected thereby. Also, the sealing washer is inexpensive and easy to manufacture, and further provides for stress relief, locking of the fastener against rotation, and vibration damping.

To the achievement of the noted advantages and other advantages which will become more apparent as the following description proceeds, the sealing washer includes an upset disc of a substantially rigid material such as metal. The upset disc has a central opening and is generally V-shape in transverse cross-section with the legs thereof defining radially inner and outer annular sidewalls which together define reversely positioned radially offset annular grooves. In each annular groove is received an annular sealing member, and the annular sealing members are integrally interconnected through openings in the radially inner sidewall whereby the same are interlocked with the upset disc. Preferably, the radially inner groove opens to the central opening of the upset disc and the annular sealing member received therein has a conical, radially inner surface which defines with the central opening a passage for a fastener. In addition, such annular sealing member may protrude axially beyond the axial extent of the disc while the other sealing member protrudes axially beyond the disc in the opposite axial direction.

The sealing washer may be used effectively with different types of fasteners. For example, a fastener a shank and countersunk-type or oval head may be employed which when tightened against the sealing element, the tapered underside portion of the fastener head thereof will come into sealing engagement with the conical inner surface of the radially inner sealing member of the sealing washer. As the fastener is tightened, the radially outer sealing member will engage the surface of the fastened part of effect a seal therewith. The sealing washer may also be employed with a fastener such as of the rounded head type which has a flat underside surface. When so employed, the protruding portion of the radially inner sealing member will engage the flat underside surface of the fastener head to effect a seal therewith.

It will be appreciated that as substantial tightening forces are exerted upon the sealing washer, radial expansion of the sealing members is precluded by the substantially rigid upset disc. In addition, the radially inner sidewall which is inclined to the sealing washer axis resists axial movement of the radially inner sealing member as the fastener head is tightened thereagainst. Moreover, the upset disc, although generally V-shaped, is gently curved at the vertex thereof and provides an attractive accent to the head of the fastener. It will be appreciated that an oval head fastener of a proper size will be substantially flush at its outer surface with the exposed annular surface of the sealing washer, such annular exposed surface of the sealing washer being gently convexly curved to provide an attractive accent for the fastener head.

The sealing element according to the invention is also useful in a novel check valve assembly wherein the sealing element forms an annular valve seat and valve seal at its respective axial sides. A poppet element carried by the sealing element is movable within the central bore of the sealing element from a closed position in sealing engagement with the radially inner annular sealing member defining the valve seat to an open position out of engagement with such valve seat. A resilient element is disposed between the poppet and sealing element for biasing the poppet element to such closed position. To form a check valve device, the check valve assembly may be readily inserted and secured, for example, in a fitting opening of a standard hydraulic fitting. The radially outer annular sealing element protrudes axially and is engageable sealingly with an annular shoulder of the housing surrounding a pressure bore opening while the poppet element extends into such opening. When the fluid pressure exceeds a predetermined pressure, the poppet will unseat to permit passage of fluid through the valve assembly.

It will be appreciated that the check valve assembly may be contructed essentially from readily available parts. For example, the poppet element may be in the form of a screw fastener having a threaded end on which is threaded a nut. The resilient element may include a coil spring which surrounds the shank of the screw fastener and is disposed between the nut and sealing element for biasing the head of the fastener against the radially inner annular sealing member or valve seat. Hence, there is provided a check valve assembly which is easy and inexpensive to manufacture.

To the accomplishment of the foregoing and related ends, the invention comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF THE PREFERRED EMBODIMENTS

Figure 1:
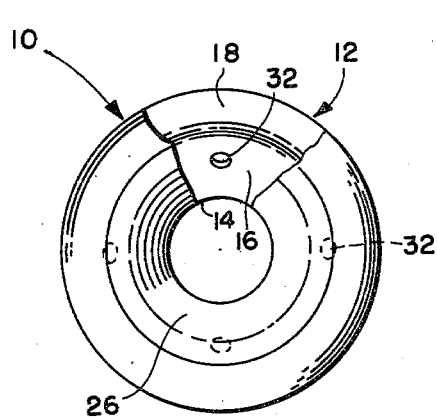
FIGS. 1 and 2 are, respectively, top and bottom plan views of the sealing element according to this invention, with portions thereof broken away.
Figure 2:
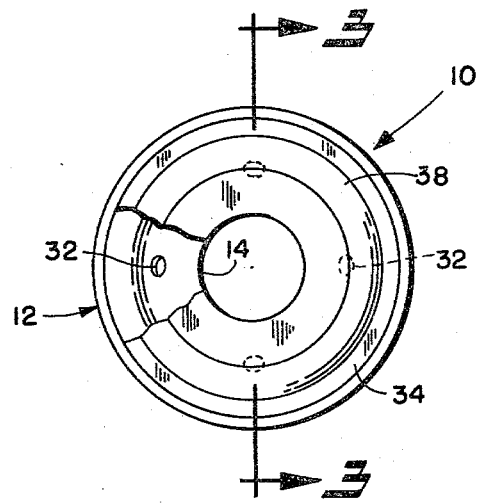
Figure 3:
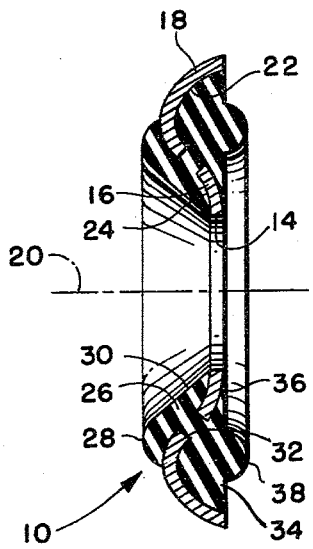
FIG. 3 is a section view of the sealing element of FIGS. 1 and 2, taken along the line 3—3 of FIG. 2.

Referring now in detail to the drawings and initially to FIGS. 1-3, a sealing element according to the invention is designated generally by reference numeral 10 and includes an annular disc 12 which has a central opening 14. The disc 12 is upset or otherwise formed to be generally V-shape in transverse cross-section with the leg thereof forming radially inner and outer annular sidewalls 16 and 18 which are integrally joined at the vertex of the V. Preferably, the disc is smoothly curved at the vertex such that the disc is essentially semi-toroidal in shape.

With the sidewalls, and particularly the inner sidewall 16, extending obliquely to the disc axis 20 from the vertex radially inwardly and the outer sidewall 18 radially outwardly, the upset disc 12 defines axially oppositely positioned and radially offset annular grooves 22 and 24. The radially outer groove 22 is formed in the bight of V while the radially inner groove 24 is defined by the inner sidewall 16. The inner groove 24 may be termed more accurately a half-groove as the inner sidewall 16 preferably terminates in the same transverse plane as the distal end of the outer sidewall 18, and preferably does not reversely extend axially to complete the inner groove 24. Instead, the groove 24 opens radially inwardly as well as axially and thus cooperates with central opening 14 to allow for passage of a fastener in the manner described below. While the disc 12 is more or less semi-toroidal in shape, the inner sidewall 16 preferably is concave radially inwardly while the outer sidewall 18 is convex radially outwardly. The concavity of the inner sdiewall 16 provides sufficient space for receipt of an inner annular sealing member 26 received in the groove 24 coaxially with the disc 12.

Such inner sealing member 26 extends axially from the inner wall 16 and preferably protrudes axially slightly beyond the outermost extent of the disc 12, and such protruding portion is preferably rounded as shown at 28. Inner sealing member 26 also includes a radially inner conical surface 30, the angle of which preferably corresponds to known tapers of countersunk-type or oval head fasteners. For example, the included angle may be about 82°. The axially and radially inner peripheral edge of the conical surface 30 terminates at the opening 14.

The inner sealing member 26 is integrally connected, through the openings 32 in the inner sidewall 16 of the disc 12 to a radially outer annular sealikng member 34 received in the outer groove 22. By such integral interconnection the sealing members are firmly locked to the disc. The same may be further secured in place by suitable adhesives if desired. The outer sealing member 34 completely fills the outer groove 22 and has an exposed surface 36 flush with the axially outer or distal ends of the sidewalls 16 and 18. Formed on the exposed surface 36 coaxial with the disc is an integral annular sealing bead 38 which is substantially semi-circular in transverse cross-sectional shape and which projects axially outwardly beyond the distal ends of sidewalls 16 and 18.

Preferably, the sealing members 26 and 34 are made of any suitable elastomeric material. Moreover, such material is preferably resilient for a reason which will become more apparent below. On the other hand, the upset disc is made of a substantially rigid material such as metal to provide structural rigidity to the sealing element. It will also be appreciated that the disc serves to retain the sealing members against unwanted radial and axial expansion which may result from high fastening forces as will be better appreciated below.

The sealing element as above described is particularly suited for molding of the same in a mold. For example, the disc 12 may be placed in the mold cavity of a mold and elastomeric material injection molded therein from either side of the disc 12. Such material will fill one of the groove areas and then be extruded through the hole to fill the other.

Figure 4:
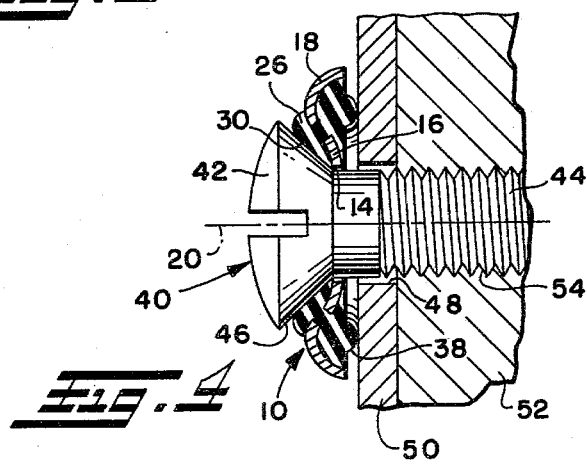

Referring now to FIG. 4, a typical fastener assembly is shown in which the sealing element 10 is employed as a sealing washer. The fastener shown at 40 is of the oval head type including head portion 42 and shank portion 44. The head portion 42 of such type of screw fastener is outwardly convex at its exposed or outer end and at its inner end or underside is conical as shown at 46. The shank portion 44 of the fastener 40 passes through the central opening 14 in the sealing element 10 and then through an enlarged opening 48 in a sheet metal piece 50 to be fastened to a body 52. The body 52 includes a threaded bore 54 in which the threaded end of the shank portion 44 is received. When tightened, the tapered underside 46 of the fastener head portion 42 will engage the inner conical surface 30 of the inner sealing member 26 to effect a seal therewith. In addition, the fastener will urge the sealing element 10 axially towards the retained sheet metal part 50 so that the annular bead 38 of the outer sealing element 34 will sealingly engage the outer surface of such retained part radially outwardly from opening 48. Accordingly, the sealing element 10 provides an effective water-and air-tight seal between the fastener head 42 and sealing element as well as betweeen the sealing element and the part 50 being secured. It will be further appreciated that upon tightening, the sealing members 26 and 34 will be effectively retained against radial and axial expansion by the upset disc 12. Thus, the sealing element 10 may be subjected to substantial tightening loads without degradation of the sealing function.

In addition, when the sealing element is properly employed as shown in FIG. 4, the distal ends of the sidewalls 16 and 18 of the disc 10 will be spaced from the surface of the metal sheet 50 by the partially compressed annular sealing bead 38. Accordingly, slight axial movement between the fastener and the part being secured will be permitted thereby to absorb vibration and to provide for stress or strain relief. In addition, the frictional engagement between the elastomeric sealing members 26 and 34 and the fastener head 42 and sheet metal part 50, respectively, will preclude rotation of the fastener 40 which may otherwise occur as a result of vibration.

Figure 5:
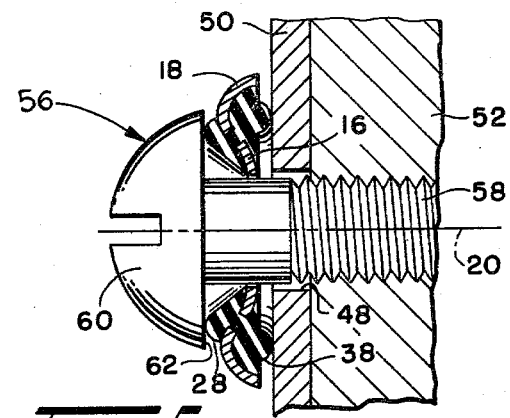
FIGS. 4 and 5 are section views of fastener assemblies illustrating the employment of the sealing element as a sealing washer therein with two different types of fasteners.

Referring now to FIG. 5, it can be seen that the sealing element 10 as a sealing washer may be employed with other types of fasteners such as the round-head type fastener shown at 56. The fastener 56 includes a threaded shank 58 and a rounded head 60 having a flat underside 62. Upon tightening of the fastener 56, the flat underside 62 of the head 60 will engage the axially protruding portion 28 of the inner sealing member 26 to effect a seal therewith. Similarly to that described above, the sealing bead 38 of the outer sealing member 34 will engage the surface of the part 50 being retained to form the seal thereat. All the advantages obtained in the assembly of FIG. 4 will be achieved by the fastener assembly illustrated in FIG. 5.

Figure 6:
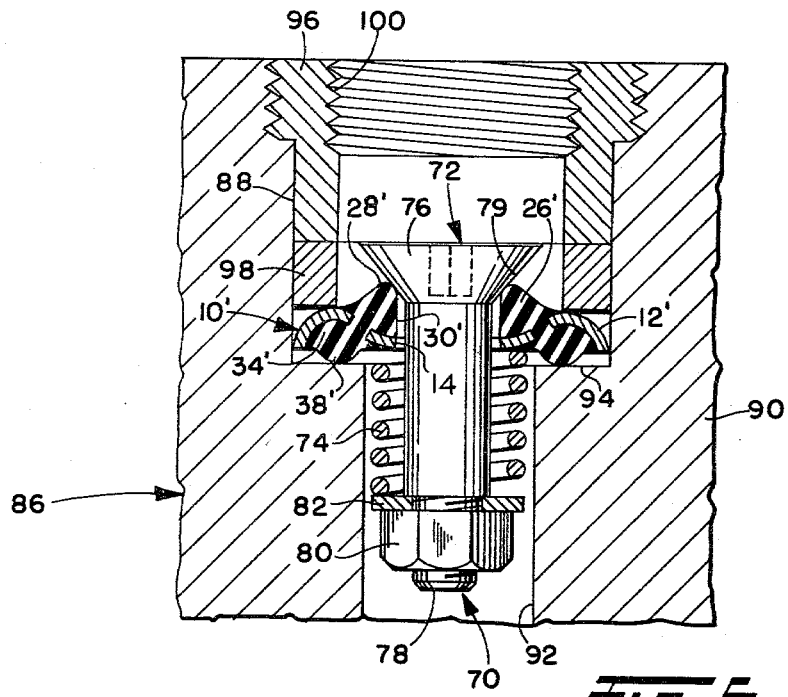
FIG. 6 is a side elevation view, mostly in section, of a check valve device according to the invention employing a modified sealing element.

The sealing element is also unquie in its application in a check valve assembly designated generally by reference numeral 70 in FIG. 6. The principal elements of the check valve assembly 70 are sealing element 10', poppet element 72 and resilient element 74, which components are described in greater detail below.

The parts of the sealing element 10' are designated with primed reference numerals corresponding generally to those identified above by the same unprimed reference numerals. Thus, the sealing element 10' includes an upset metal disc 12' having central opening 14' and reversely positioned annular grooves which retain annular sealing members 26' and 34', respectively.

The inner sealing member 26' has a radially inner surface 30' which cooperates with central opening 14' to provide for passage of the shank of the poppet element. In contrast to the preferred form of sealing element described above for employment as a sealing washer, the interior surface 30' is cylindrical and flush with the central opening 14'. The inner sealing member 26' protrudes substantially beyond the disc 12' and at its outermost extension is convexly curved to define a valve seat as indicated at 28'. The outer sealing member 34' protrudes axially beyond the disc 12' oppositely the inner sealing member 26'. Such protrusion may be in the form of annular bead 38' positioned coaxially with the sealing element. It will be appreciated below that the bead 38' forms a valve seal for effective sealing engagement with the shoulder of a valve housing hereinafter more fully described.

The popet element 72 may be in the form of a bolt having a head portion 76 and shank portion 78. The head portion 76 preferably has a tapered or conical underside as shown at 79. The shank portion 78 need only be threaded at its distal end for threaded engagement with nut 80. There may also be provided a washer 82 which is secured to the shank portion by the nut, which washer 82 presents an abutment surface 84 against which the resilient element 74 acts.

The resilient element 74 may be in the form of a coil spring which coaxially surrounds the shank portion 78. The spring 74 is disposed between the sealing element 10' and abutment surface 84 of the washer 82 thereby to resiliently urge or bias the head portion 76 of the fastener 72 against the valve seat 28' formed by the sealing element 10'.

It should be appreciated that the fastener 72 and coil spring 74 may be selected from readily available stock items and require no special machining or manufacturing procedures which add to the cost of known check valves.

The above described check valve assembly 70 may be readily incorporated into various arrangements to provide a valve device 86. As shown, the check valve assembly 70 may be conveniently inserted into an opening 88 in a valve housing 90 normally provided to receive a fitting for connection thereto of a fluid conduit. The housing 90 includes a fluid passage 92 which opens at an annular shoulder 94 to the larger cylindrical opening 88. The fluid passage 92 may communicate with a source of pressurized fluid for which control or pressure relief is desired. The check valve assembly 70 is secured in the fitting opening 88 by a plug or fitting 96 threadedly received in such opening 88. A spacer ring 98 mays be provided to hold the sealing element 10' in fixed position and to ensure proper compression of the annular bead 38' when the fitting 96 is fully tightened in place. It will be appreciated that the spacer ring will engage the sealing washer radially outwardly of the protruding inner seal 26' at the radially outer portion of the upset disc 12'. If desired, the fitting 96 may be internally threaded as at 100 for connection of a conduit fitting (not shown).

In operation, pressurized fluid in passage 92 will act on the poppet element 72 tending to urge the same against the biasing force of spring 74. Since the spring normally will be preloaded, the head portion of the poppet will unseat from valve seat 28' only when the pressure is sufficient to counteract the preload. When the head portion is unseated, fluid will be permitted to pass through the orifice formed between the underside 79 of the head land valve seat 28'.

While the check valve broadly provides for pressure relief in the above manner, it will be appreciated that the same will provide for control of fluids. For example, the check valve may act as a throttling valve wherein the opening size is related to the fluid pressure in the fluid passage.

The pressure at which the check valve device 86 will open may be easily adustable loosening or tightening the nut 80 on the shank portion 78. Such adjustment will change the amount of preload of the spring and thus require a greater or lesser pressure to open the valve.

Figure 7:
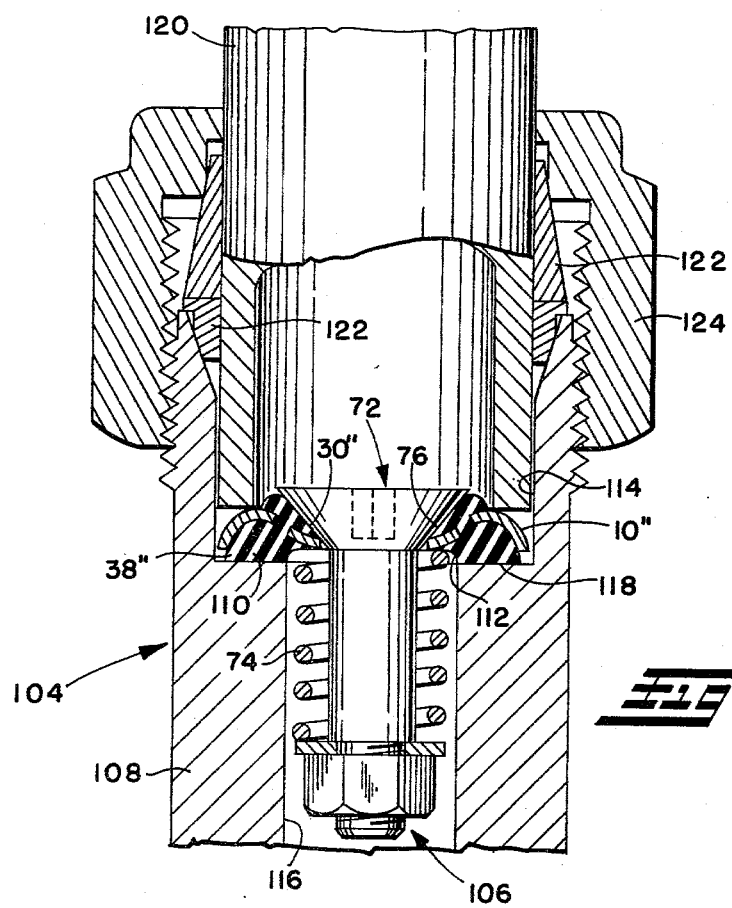
FIG. 7 is a side elevation view, mostly in section, of a modified form of check valve device according to the invention.

In FIG. 7, another form of check valve device 104 according to the invention is shown in which a modified check valve assembly 106 is employed. The check valve assembly 106 is similar in contruction to the above described check valve assembly 70 and includes sealing element 10", poppet element 72 and resilient element 74.

Sealing element 10", the parts of which are designated with double primed reference numerals corresponding generally to those identified above by primed and unprmed reference numerals, has a modified annular bead 38" which is rectilinear in transverse cross-sectional shape which provides an annular planar valve sealing surface 110. The annular bead 38" is relieved at its radially inner portion to form an annular recess 112. The annular recess 112 preferably is of a diameter slightly greater than the outer diameter of coil spring 74 whereby the annular recess 112 serves to prevent lateral displacement of the spring when seated therein. Also in contrast to the sealing element 10' of FIG. 6, the inner sealing member 26' has a conical radially inner surface 30" more akin to that shown in connection with the sealing element described above for employment as a sealing washer. The conical inner surface 30" forms the valve seat for the poppet element 72, the tapered underside of the head portion 76 being normally biased by the coil spring 74 for mating engagement with the conical inner surface 30".

The check valve assembly 106 is readily adapted for insertion into any correspondingly sized standard fitting such as fitting 108 to form check valve 104. The fitting 108 has a large diameter outer bore 114 and small diameter inner bore 116 which are coaxial and forms at their intersection an annular shoulder 118. The check valve assembly 106, when inserted in the fitting, abuts the shoulder 118 at the annular bead 38 which forms a seal therewith. Securement of the check valve assembly 106 in the fitting is obtained by insertion of tubular conduit 120 into the outer bore 114 and fastening of such conduit 120 in place by suitable compression rings and nut 122 and 124, respectively. The end of the conduit should bear against the radially outward portion of upset disc 12" with sufficient force to ensure the desired seal betweens the sealing element 10" and shoulder 118.

The operation of the check valve device 104 will be essentially the same as described above in connection with check valve device 86.

Although the invention is shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the claims.

The embodiments of the invention in which an exclusive property or privilege is claimed are defined as follows:

1. A washer for use with a fastener having a head and shank, the shank of which is to be received in a bore of an article being secured by the fastener, said washer comprising a substantially rigid annular upset disc of an overall V-shape cross-section having radially inner and outer sidewalls that terminate at their distal ends substantially at a common plane normal to the axis of said disc, said distal ends defining the article opposing surface of said disc, a first annular elastomeric member positioned between and substantially contained against radial expansion by said sidewalls, and a second annular elastomeric member positioned interiorly of and substantially contained against radial outward expansion by said radially inner sidewall, said first and second members protruding axially slightly beyond said disc in opposite axial directions for effecting engagement with the head and face, respectively, when said fastener is received in said bore and drawn against said washer, and said radially inner sidewall throughout the extent thereof being substantially inclined to the axis of said disc, whereby said radially inner sidewall resists axial movement of said second member upon tightening of the fastener thereagainst.

2. The washer of claim 1, for use with an oval head type fastener or the like having a head with a conical underside, wherein said second member has conical radially inner surface adapted for effecting engagement with the conical underside of the fastener head.

3. The washer of claims 1 or 2 wherein said first member has a substantially planar exposed surface and an integral annular bead on said exposed surface protruding axially slightly beyond said disc.

4. The washer of claim 3 wherein said exposed surface is flush with the dital ends of said sidewalls.

5. The washer of claims 1 or 2 wherein said radially inner sidewall is inwardly concave and said radially outer sidewall is outwardly convex.

6. The washer of claim 1 or 2 wherein said members are integrally connected.

7. The washer of claims 1 or 2 wherein said inner sidewall has an opening and said members are isntegrally interconnected through said opening.

8. The washer of claims 1 or 2 wherein said disc is of substantially uniform thickness.

* * * * *

UNITED STATES PATENT OFFICE
CERTIFICATE OF CORRECTION

Patent No. 4,280,390                    Dated July 28, 1981

Inventor(s) Myles N. Murray

It is certified that error appears in the above-identified patent and that said Letters Patent are hereby corrected as shown below:

In claim 1, line 3, before "said", insert --the bore opening to a face of the article, --.

*Signed and Sealed this*

*Third* Day of *November 1981*

[SEAL]

*Attest:*

GERALD J. MOSSINGHOFF

*Attesting Officer*          *Commissioner of Patents and Trademarks*